Patented Mar. 28, 1939

2,152,536

UNITED STATES PATENT OFFICE 2,152,536

LIQUID COATING COMPOSITION

Hugh S. Cooper, Shaker Heights, Ohio, assignor to Cooper Products, Inc., Cleveland, Ohio, a corporation of Ohio No Drawing. Application November 25, 1935, Serial No. 51,469

1 Claim. (Cl. 134—39)

The present invention relates to a novel material useful as a pigment for paints, varnishes, and enamels, as a "base" for inks and especially colored printing inks, and as a filler and opacifier for papers, etc.

In the paint industry, large quantities of white pigment are used. The necessary properties required in these pigments are pure white color, great opacity or tinting strength or covering power, as it is variously called, and permanence under the conditions to which it is exposed.

In inks, and especially in colored inks of the pasty type used in printing, a material of generally similar qualities is also required as an addition or thickener or "base". This "base" thickens the ink and reduces the quantity of the relatively expensive pigment that would otherwise have to be used. For this purpose the base material must likewise possess the qualities of inertness, permanence, white color that will not interfere with the other pigments added, high covering power, and also great ability to absorb liquids.

In the making of paper, and especially thin paper for use in printing, it is desirable that the paper shall be opaque with minimum thickness, otherwise the printing on the reverse side shows through. To make the paper opaque, a "filler" is used which must possess the general properties already mentioned, namely, it must be white, permanent, have great opacity or hiding power, and, in addition, be chemically inert.

I have discovered that boron nitride makes an excellent pigment for paints, varnishes, and enamels; that it makes an excellent addition for colored printing inks; that it is an excellent filler for paper; and that it possesses the qualities desired in such materials, and in many other materials and applications of a similar nature.

Boron nitride is a pure dazzling white powder, very soft and unctuous or "soapy" to the touch. Chemically it is very inert and remains wholly unaffected by unfavorable atmospheric conditions by any of the mineral acids and by most of the common reagents. It is also unaffected by heat, and is permanent in air to about 500° C. In hydrogen, nitrogen and other selected atmospheres it can be heated without fusing, until it finally reaches its dissociation temperature, probably about 3000° C. It has a low specific gravity and is therefore very economical in use because most of the applications that have been referred to depend upon bulk or volume rather than weight. The applications mentioned all require a finely powdered material, and boron nitride is readily obtainable or produced in this form.

Tests show that its absorption power is very high. One gram of boron nitride absorbs from one to two cubic centimeters of oil, depending on how it is prepared. This is from two to six times as great an absorbing power as is shown by other materials commonly used for the purposes mentioned, such as zinc oxide, titanium oxide, antimony oxide, lithopone, etc. This property is especially useful in thickening inks and oils.

Tests also show that in covering power it is twice as effective as zinc oxide, and is equivalent to such materials as "titanolith" and "titanox B", commercial names for certain commonly used pigments containing titanium oxide.

X-ray spectroscopy shows that boron nitride is one of the class of "layer-forming" substances, that is, that it forms into plates or sheets one atom thick with a symmetrical arrangement of the atoms of boron and nitrogen within the sheet or plate, the principal valences of the boron and nitrogen being satisfied within the plane of the plate or sheet, and only weak secondary valences or forces acting between superimposed plates. This structure is commonly supposed to account for its unctuous feel, similar to that of graphite which has a like molecular arrangement, the unctuous quality being due to lack of friction between the superimposed plates. It is believed that the virtue of boron nitride as a pigment, etc. is due to this same property, and that a coating comprising this material probably consists of closely interleaved plates or flakes of boron nitride, rather than of heterogenously arranged grains as in other materials.

Boron nitride may be readily prepared by a number of methods. One method is by passing boron chloride and ammonia, both of which are gases, through a heated tube. Another and very simple method is to heat a mixture of borax and ammonium chloride. Material made by either of those methods is suitable for the purposes mentioned in this specification. If desired, the boron nitride may be deposited on or mixed with a cheaper white material which alone is not suitable for the present purpose such as barium sulphate or calcium sulphate to produce what is known as a "lithopone".

Paints or varnishes comprising boron nitride may be made in any color and contain any of the ordinary vehicles, such as linseed oil, soya bean oil, China-wood oil, etc.; any of the ordinary solvents, such as turpentine, petroleum spirit, coal tar naphtha, etc., and any of the ordinary driers, such as Japan drier, manganese drier, cobalt drier, etc. The same is true with ink. In the case of printers' inks, any varnish, such as linseed oil or rosin varnish, including a drier and coloring material, may be used.

In making colored inks or paints, the boron nitride may be mixed with the vehicle before or after the coloring material has been added, or it may first be mixed with the coloring material to produce what is known as a "color". If desired, "colors" of this character having a boron nitride base may be sold as an article of manufacture.

Lacquers comprising boron nitride may be made with the usual solvents such as alcohols, esters, etc., the usual natural and synthetic resins, such as damar gum, cellulose nitrate, vinyl compounds, phenol condensation products, etc.

In the manufacture of paper, the filler, in addition to boron nitride, may contain any of the ordinary substances such as kaolin, titanium oxide, magnesia, etc.

The word vehicle as used in the appended claim denotes a material such as oil or solvent used to dissolve or suspend the pigment and other materials in a paint, varnish, ink, lacquer, or enamel.

Having thus described my invention, what I claim is:

A liquid coating composition comprising boron nitride as a pigment and a vehicle of the class consisting of drying oils, natural and synthetic resins, and cellulose derivatives.

HUGH S. COOPER.